United States Patent
Marusco et al.

(10) Patent No.: US 9,823,079 B2
(45) Date of Patent: Nov. 21, 2017

(54) POLYGONAL ROUTING

(71) Applicant: Apple Inc., Cupertino, CA (US)

(72) Inventors: Austin A. Marusco, San Francisco, CA (US); Ashish Agarwal, Sunnyvale, CA (US); Justin M. Strawn, Palo Alto, CA (US); Mithilesh Kumar, San Jose, CA (US); Vincent P. Arroyo, Union City, CA (US); Max Muller, III, San Jose, CA (US); Vojislav Samsalovic, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/869,830

(22) Filed: Sep. 29, 2015

(65) Prior Publication Data

US 2017/0089709 A1  Mar. 30, 2017

(51) Int. Cl.
*G01C 21/20* (2006.01)

(52) U.S. Cl.
CPC .................. *G01C 21/206* (2013.01)

(58) Field of Classification Search
CPC .................................... G01C 21/206
USPC ....................................... 701/533
See application file for complete search history.

(56) References Cited

U.S. PATENT DOCUMENTS

| | | | |
|---|---|---|---|
| 7,397,424 B2 | 7/2008 | Houri | |
| 7,856,234 B2 | 12/2010 | Alizadeh-Shabdiz et al. | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,223,074 B2 | 7/2012 | Alizadeh-Shabdiz | |
| 8,369,264 B2 | 2/2013 | Brachet et al. | |
| 8,478,297 B2 | 7/2013 | Morgan et al. | |
| 8,836,580 B2 | 9/2014 | Mendelson | |
| 8,866,673 B2 | 10/2014 | Mendelson | |
| 8,896,485 B2 | 11/2014 | Mendelson | |
| 8,941,485 B1 | 1/2015 | Mendelson | |
| 8,983,493 B2 | 3/2015 | Brachet et al. | |
| 9,020,687 B2 | 4/2015 | Mendelson | |
| 9,204,251 B1 | 12/2015 | Mendelson | |
| 9,204,257 B1 | 12/2015 | Mendelson | |
| 2009/0043489 A1* | 2/2009 | Weidner | G01C 21/20 701/533 |
| 2011/0080848 A1 | 4/2011 | Khorashadi et al. | |
| 2011/0178811 A1 | 7/2011 | Sheridan | |
| 2012/0064855 A1 | 3/2012 | Mendelson | |
| 2014/0253371 A1 | 9/2014 | Chen et al. | |
| 2014/0372031 A1* | 12/2014 | Canner | G01C 21/206 701/533 |
| 2015/0052460 A1 | 2/2015 | Mohammad Mirzaei et al. | |

* cited by examiner

*Primary Examiner* — Brian P Sweeney
(74) *Attorney, Agent, or Firm* — Fish & Richardson P.C.

(57) ABSTRACT

Methods, systems, and computer program products for polygonal routing are described. A computer system can provide turn-by-turn navigation in a venue for a mobile device using a navigation graph. The navigation graph can include nodes representing a series of navigation areas leading from a start point to an end point in a venue including indoor space. Each navigation area can be a polygon occupying a non-zero geographic area. The computer system updates the turn-by-turn instructions when the mobile device enters or exits a navigation area in the series of navigation areas, until the device reaches the end point.

12 Claims, 12 Drawing Sheets

POLYGONAL ROUTING

TECHNICAL FIELD

This disclosure relates generally to location determination.

BACKGROUND

Some mobile devices have turn-by-turn navigation functions. In turn-by-turn navigation, a device can present audio or visual instructions on where to make a next turn and to which direction. Typically, the device relies on accurate location information to avoid providing wrong instructions or providing the instructions too early or too late. In an outdoors environment, the device can use global navigation satellite system (GNSS) signals and street maps to provide turn-by-turn navigation instructions.

Indoor environments, in contrast, may present challenges to turn-by-turn navigation. GNSS signals may be weak or unavailable indoors, resulting in inaccurate location fixes. Features of the indoor environment (e.g., hallways and doors) may be small compared to achievable location accuracy. Accordingly, even when a device has a map of an indoor space, indoor turn-by-turn navigation may be impractical.

SUMMARY

Techniques of polygonal routing are described. A computer system can provide turn-by-turn navigation in a venue for a mobile device using a navigation graph. The navigation graph can include nodes representing a series of navigation areas leading from a start point to an end point in a venue including indoor space. Each navigation area can be a polygon occupying a non-zero geographic area. The computer system updates the turn-by-turn instructions when the mobile device enters or exits a navigation area in the series of navigation areas, until the device reaches the end point.

A computer system can generate the navigation graph from venue data describing a venue having indoor space. The computer system can determine one or more paths in the venue. The computer system can determine primary waypoints on each path that are located at intersections, and secondary waypoints on each path that correspond to a unit along the path. The computer system can then generate a navigation area around each waypoint, and create the navigation graph representing the navigation areas. The computer system can provide the turn-by-turn navigation using the navigation graph.

A computer system can receive a request for turn-by-turn navigation in a venue. The computer system can determine a first navigation area represented in a navigation graph that intersects a start point, and a second navigation area represented in the navigation graph that intersects an end point. The computer system can determine a shortest path in the navigation graph. The shortest path can include a series of navigation areas. The computer can determine a turn-by-turn instruction based on entrance and exit of each of the series of polygons.

The features described in this specification can be implemented to achieve various advantages. For example, compared to conventional navigation techniques that use line-based routing, polygonal routing is more tolerant to positioning errors or inaccuracies. Polygonal routing is therefore more stable in space where geographic features have granularity that is similar to, or finer than, granularity of positioning accuracy (e.g., in indoor space). Accordingly, polygonal routing can reduce navigation errors in indoor space and offer a better user experience. Polygonal routing allows for turn-by-turn navigation, which requires less display area than a conventional indoor navigation device typically would require, because turn-by-turn navigation does not require the display of a map. Accordingly, polygonal routing is suitable for devices with small display surfaces, e.g., wearable devices.

The details of one or more implementations of the techniques are set forth in the accompanying drawings and the description below. Other features, aspects and advantages of the indoor location survey techniques will become apparent from the description, the drawings and the claims.

BRIEF DESCRIPTION OF THE DRAWINGS

Like reference symbols in the various drawings indicate like elements.

DETAILED DESCRIPTION

Example Polygonal Routing

Figure 1:
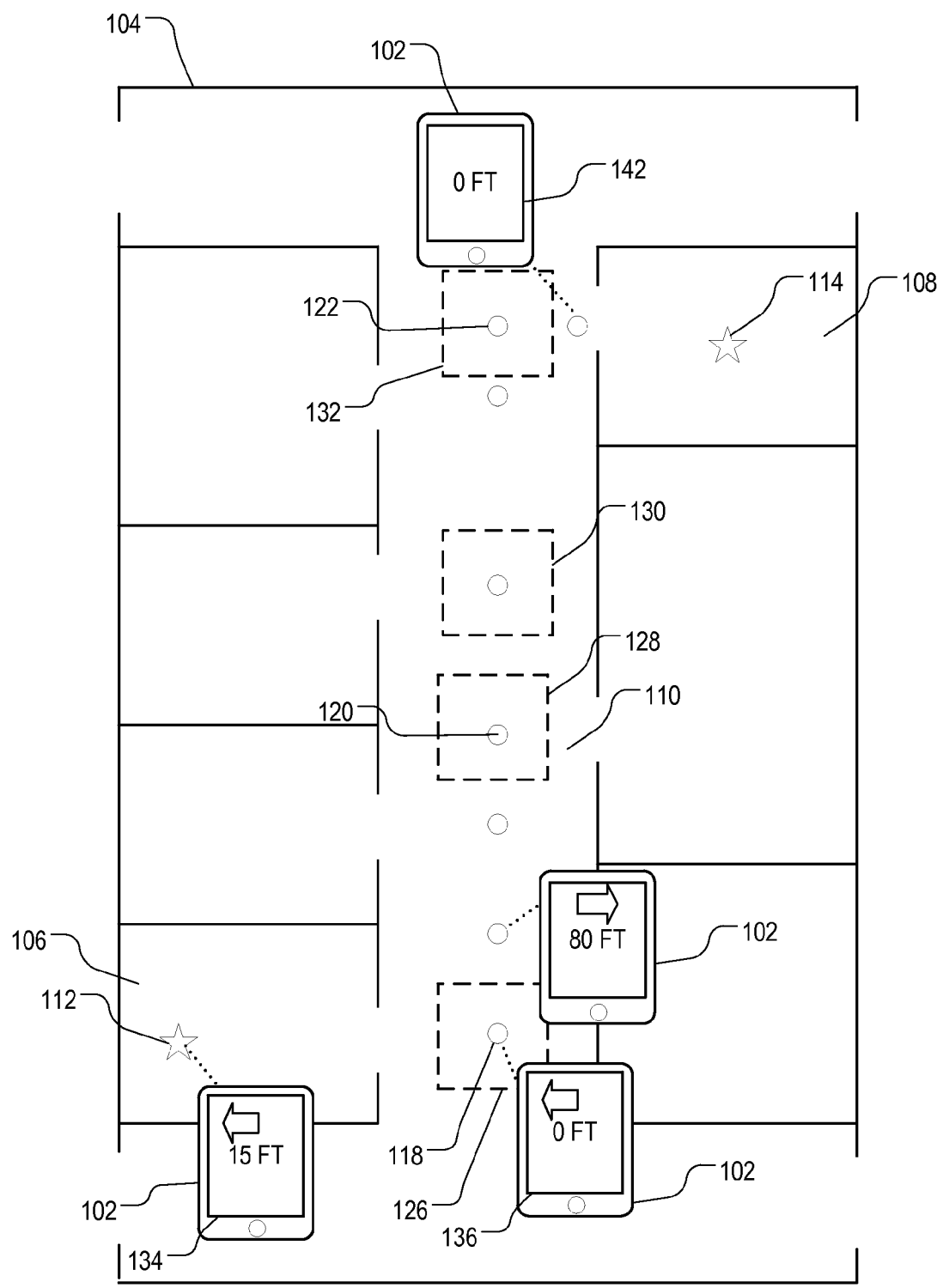
FIG. 1 is a diagram providing an overview of polygonal routing in a venue.

FIG. 1 is a diagram providing an overview of polygonal routing in a venue. Mobile device 102 can be a device configured to provide turn-by-turn instructions for navigating in example venue 104. Mobile device 102 can be carried by a user at venue 104. Mobile device 102 can be a computing device, e.g., a smart phone, a wearable electronic device or a tablet computer. The user can be a pedestrian. The user can be a vehicle programmed to move around in venue 104.

Venue 104 can be a structured space accessible by a pedestrian. The structure of venue 104 can include one or more constraints limiting a user's movement in the space. For example, venue 104 can be a business center having walls separating multiple units. The units can include shops, offices, lounges, or other spaces. In the example shown, venue 104 has unit 106 and unit 108.

Venue 104 may have one or more open spaces, e.g., walkway 110, that connects the units. Walkway 110 may have a width that is similar to the limit of accuracy of a location determination system of mobile device 102.

Mobile device 102 can receive a request from a user to navigate to unit 108. At time mobile device 102 receives the request, mobile device 102 can determine that mobile device 102 is located at a location in unit 106. Mobile device 102 can designate this location as start point 112. Mobile device 102 can designate a location in unit 108, e.g., a centroid of unit 108, as end point 114 for navigation.

Mobile device 102 can determine a route from start point 112 to end point 114 from a navigation graph. The route can include a series of waypoints, e.g., waypoints 118, 120 and 122. Each waypoint is represented as a white dot in FIG. 1. Each waypoint can correspond to a unit in venue 104. Additional details of generating waypoints, including waypoints 118, 120 and 122 are discussed below in reference to FIGS. 2-4. Mobile device 102 can determine that to reach end point 114, mobile device 102 should first head for waypoint 118, turn left at waypoint 118, go straight until hit waypoint 122, then turn right.

Mobile device 102 can provide turn-by-turn navigations instructions using navigation areas around the waypoints. Each waypoint can be associated with a respective navigation area. For convenience, only navigation areas 126, 128, 130 and 132 are shown. Mobile device 102 can provide turning directions upon detecting entrance into or exit from each navigation area on a route through venue 104.

For example, after determining the route and determining that mobile device 102 is heading towards navigation areas 126, mobile device 102 can display a first navigation instruction 134, instructing a user carrying mobile device 102 to turn to a direction after a calculated distance (e.g., turn left after 15 feet). Mobile device 102 can update a distance to a next turn as mobile device 102 moves. Upon entering a navigation area in which mobile device 102 should turn (e.g., navigation area 126 of waypoint 118), mobile device 102 can update navigation instruction 134. Updating navigation instruction 134 can include, for example, setting the distance to turning point to zero, while maintaining the turning direction. Accordingly, while in navigation area 126, mobile device can display navigation instruction 136 (e.g., turn left after zero feet) regardless of the location of mobile device 102 inside navigation area 126 and regardless of the direction mobile device 102 is heading in.

Upon exiting navigation area 126, mobile device 102 can update the navigation instruction 136 for a next turn (e.g., turning right) and an estimated distance to next turn (e.g., 80 feet).

While mobile device 102 moves through navigation areas (e.g., navigation areas 128 and 130) on the way to end point 114, mobile device 102 can update a distance to next turn as mobile device 102 enters or exits each navigation area, until mobile device 102 reaches navigation area 132. Navigation area 132 can be a polygon in which mobile device 102 should turn. While mobile device 102 is in navigation area 132, mobile device 102 can display a navigation instruction for turning right to the direction of end point 114, and display a distance to the turn as zero. Mobile device 102 can present navigation instruction 142 upon exiting navigation area 132. Instruction 142 can indicate that mobile device 102 has arrived at end point 114 or at an entrance to a unit that encloses end point 114.

The navigation areas used in turn-by-turn navigation and routing in FIG. 1 are illustrated as polygons. In particular, navigation areas 126, 128 130, and 132 are shown as squares. In various implementations, the navigation areas can be in any geometric shape that encloses a geographic area. For example, the navigation areas can be rectangles, pentagons, or other polygons. The navigation areas can be circles, ellipses or other curved shapes that are not polygons. Accordingly, "polygonal routing" can include routings that are based on navigation areas that are polygons and navigation areas that are not polygons.

Example Navigation Graph Generation

Figure 2:
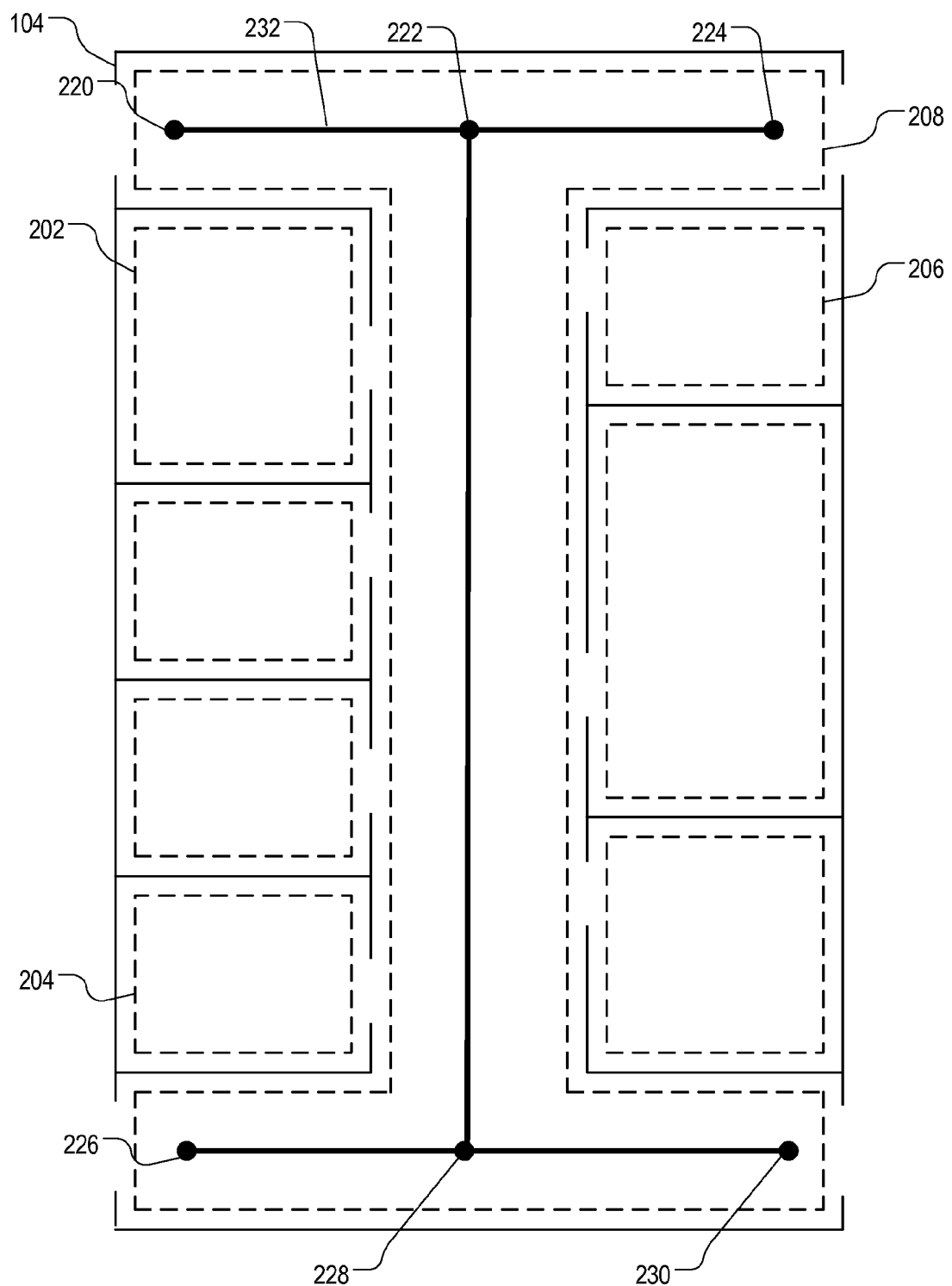
FIG. 2 is a diagram illustrating example operations of generating a navigation graph for polygonal routing.

FIG. 2 is a diagram illustrating example operations of generating a navigation graph for polygonal routing. The operations can be performed by a navigation graph generator including one or more processors and computer instructions for causing the one or more processors to perform various operations.

The navigation graph generator can receive venue data for venue 104. The venue data can include definitions of features in venue 104, including buildings, levels, openings, roadways, sections, points or points of interests (POIs), details, fixtures, or occupants (e.g., shops or offices). For convenience, these features will be referred to as units. In the venue data, each unit can be associated with an identifier, a geometry, one or more locations of entrances (if applicable), and an indicator indicating access restrictions on the unit. The geometry can include areas, e.g., polygons 202, 204, 206 and 208, each corresponding to a respective unit.

In particular, for example, polygons 202, 204 and 206 can correspond to units including, for example, shops, restaurants or offices that each may be a destination of navigation. Accordingly, polygons 202, 204, 206 and 208 can be referred to as destination areas. Polygon 208 can correspond to a path (e.g., a walkway, hallway, promenade, or other walkable space) that connects other units including shops or offices. Accordingly, polygon 208 can be referred to as a connection area. Each area may be a convex or concave polygon, may contain one or more holes and may contain disjointed areas.

The navigation graph generator can receive input placing primary waypoints 220, 222, 224, 226, 228 and 230 in venue 104. Primary waypoints 220, 222, 224, 226, 228 and 230 can be points on a walkway that are located at entrances of the path (e.g., primary way points 220, 224, 226 and 230), at intersections of the path (e.g., primary way points 222 and 228), or at bends of the path.

In some implementations, the navigation graph generator can display a map of venue 104 on a display surface, and receive user input on the map placing primary waypoints 220, 222, 224, 226, 228 and 230 at various locations. The navigation graph generator can then connect primary waypoints 220, 222, 224, 226, 228 and 230, resulting in path 232. The navigation graph generator can determining path 232 by connecting each two primary waypoints that are reachable to one another by a direct line as permissible by the shape of an area (e.g., polygon 208) containing the primary waypoints. Path 232 can have multiple sections. The navigation graph generator can designate each portion of path 232 between two adjacent primary waypoints as a section. For example, path 232 can have a first section between primary waypoints 220 and 222, and a second section between primary waypoints 222 and 228.

In some implementations, the navigation graph generator can parse the received venue data, determine a path based on polygons in the venue data, determine entrances, intersections, and bends of the path, and automatically place primary waypoints 220, 222, 224, 226, 228 and 230 at the entrances, intersections, and bends without using placement by a user.

The navigation graph generator can then generate waypoint areas on path 232 for navigation, as described below in reference to FIG. 3.

Figure 3:
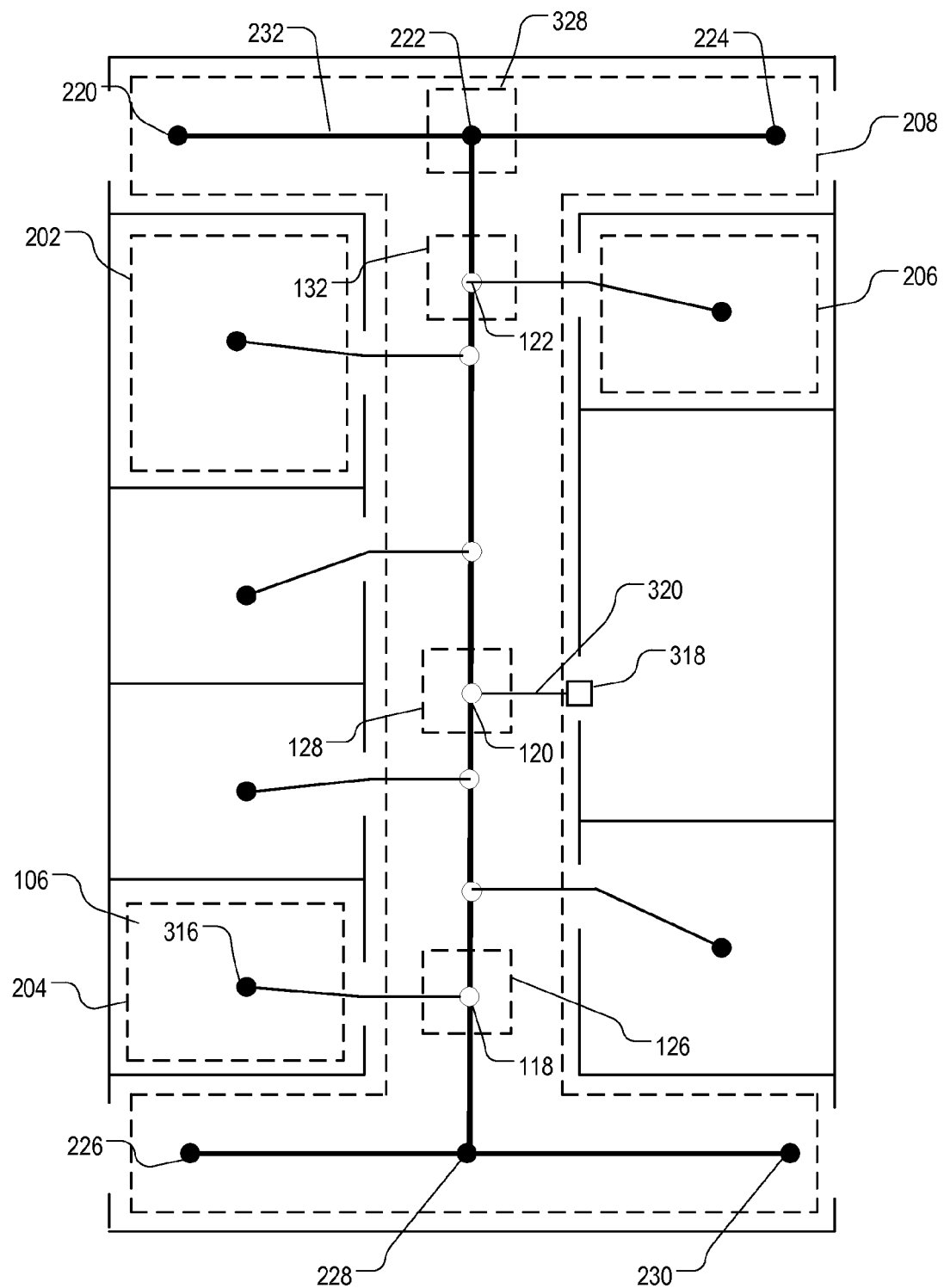
FIG. 3 is a diagram illustrating example operations of generating navigation areas.

FIG. 3 is a diagram illustrating example operations of generating navigation areas. Having defined primary waypoints 220, 222, 224, 226, 228 and 230 and path 232, the navigation graph generator can generate secondary waypoints, including secondary waypoints 118, 120 and 122 on path 232. Each of secondary waypoints 118, 120 and 122 can correspond to a unit that is adjacent to and accessible from path 232. Each of secondary waypoints 118, 120 and 122 can be used to generate a navigation area. Each navigation area can serve as a checkpoint for turn-by-turn navigation. Each unit that is adjacent to and accessible from path 232 can have a corresponding secondary waypoint on path 232. In FIG. 3, secondary waypoints on path 232 are represented as white dots.

To determine secondary waypoints 118, 120 and 122, the navigation graph generator can determine a centroid of each corresponding unit. The navigation graph generator can determine a shortest distance from that centroid to path 232. The navigation graph generator can designate the point that the shortest distance intersects path 232 as the corresponding secondary waypoint.

For example, the navigation graph generator can determine centroid 316 of polygon 204, which correspond to unit 106. The navigation graph generator can then determine a shortest distance between centroid 316 and path 232. In some implementations, the shortest distance can be a direct line. In some implementations, the shortest distance passes through an entrance of unit 106 to path 232. In such cases, the shortest distance may or may not be a straight line. The navigation graph generator can determine an intersection point of the shortest distance and path 232. The navigation graph generator can designate the intersection point as secondary waypoint 118.

In some implementations, instead of using a distance between a centroid of a unit and path 232, the navigation graph generator can determine the secondary waypoints using a shortest distance between an entrance of a unit and path 232. For example, the navigation graph generator can determine entrance waypoint 318. Entrance waypoint 318 can correspond to a location of an entrance to a unit. The location of the entrance can be determined based on venue survey data. The navigation graph generator can determine shortest distance 320 between entrance waypoint 318 and path 232. The navigation graph generator can designate an intersection point between shortest distance 320 and path 232 as secondary waypoint 120.

In some implementations, the navigation graph generator can determine entrance waypoint 318 based on a size of the entrance as determined in a location survey. For example, the navigation graph generator can represent the entrance using a single entrance waypoint 318 if the entrance has a width that is smaller than a threshold value (e.g., five meters). Accordingly, if the entrance includes multiple doorways that are located close to one another, entrance waypoint 318 can represent the multiple doorways. If the survey data shows that the entrance is wider than the threshold value, the navigation graph generator can represent the entrance as multiple entrance waypoints, even if the wide entrance includes only a single doorway.

For each primary waypoint and a secondary waypoint, the navigation graph generator can generate a type of navigation area designated as a waypoint area. A waypoint area can be a navigation area surrounding a primary or secondary waypoint. For example, the navigation graph generator can generate waypoint areas 126, 128 and 132 surrounding secondary waypoints 118, 120 and 122, respectively. The navigation graph generator can generate waypoint area 328 around primary waypoint 222. For clarity, other waypoint areas are not shown.

Each waypoint area can be a polygon, a circle, an ellipse or any other convex or concave geometric shape having a non-zero area. The navigation graph generator can determine a size of each of waypoint areas 126, 128, 132 and 328 based on a width of path 232. The width of path 232, at any given point, can be limited by the width of a binding polygon that encloses and binds path 232 (e.g., polygon 208 of FIG. 2) at that point.

For example, the navigation graph generator can determine that waypoint area 128 is a square centered at secondary waypoint 120. The navigation graph generator can determine a size of waypoint area 128 by extending a side of the square outward towards the binding polygon until at least one end that side hits the binding polygon. The navigation graph generator can designate twice of the distance between the center (waypoint 120) and that end, or a portion thereof, as the length of a side of the square. The navigation graph generator can designate the square as waypoint area 128 associated with waypoint 118.

In addition to generating waypoint areas, the navigation graph generator can designate each polygon of a unit adjacent to path 232 as a destination area. A destination area can be a type of navigation area that is located in a unit rather than on path 232. The navigation graph generator can designate polygons 202, 204 and 206 as destination areas.

In addition, the navigation graph generator can designate connection areas. A connection area can be a type of navigation area that corresponds to a section of a path and can enclose one or more waypoint areas and space between the one or more waypoint areas, if any. The navigation graph generator can designate a respective portion of polygon 208 corresponding to each section of path 232 as a connection area. For example, in the example shown, the navigation graph generator can designate a vertical section of polygon 208 that encloses primary waypoint 222, the secondary waypoints 118, 120 and 122, and waypoint areas 126, 128, 132 and 328 as a first connection area. The navigation graph generator can designate a horizontal section of polygon 208 that includes primary waypoints 220 and 222, as well as waypoint 328, as a second connection area. Waypoint areas, destination areas, and connection areas can overlap one another.

In some implementations, the navigation graph generator can designate a public space other than a path as a connection area. The public space can be a space, e.g., a square, a food court or a central hall, that has access to multiple units in the unit. The navigation graph generator can designate a polygon enclosing the public space as a connection area. Each unit that is accessible from the public space can be interconnected.

Figure 4:
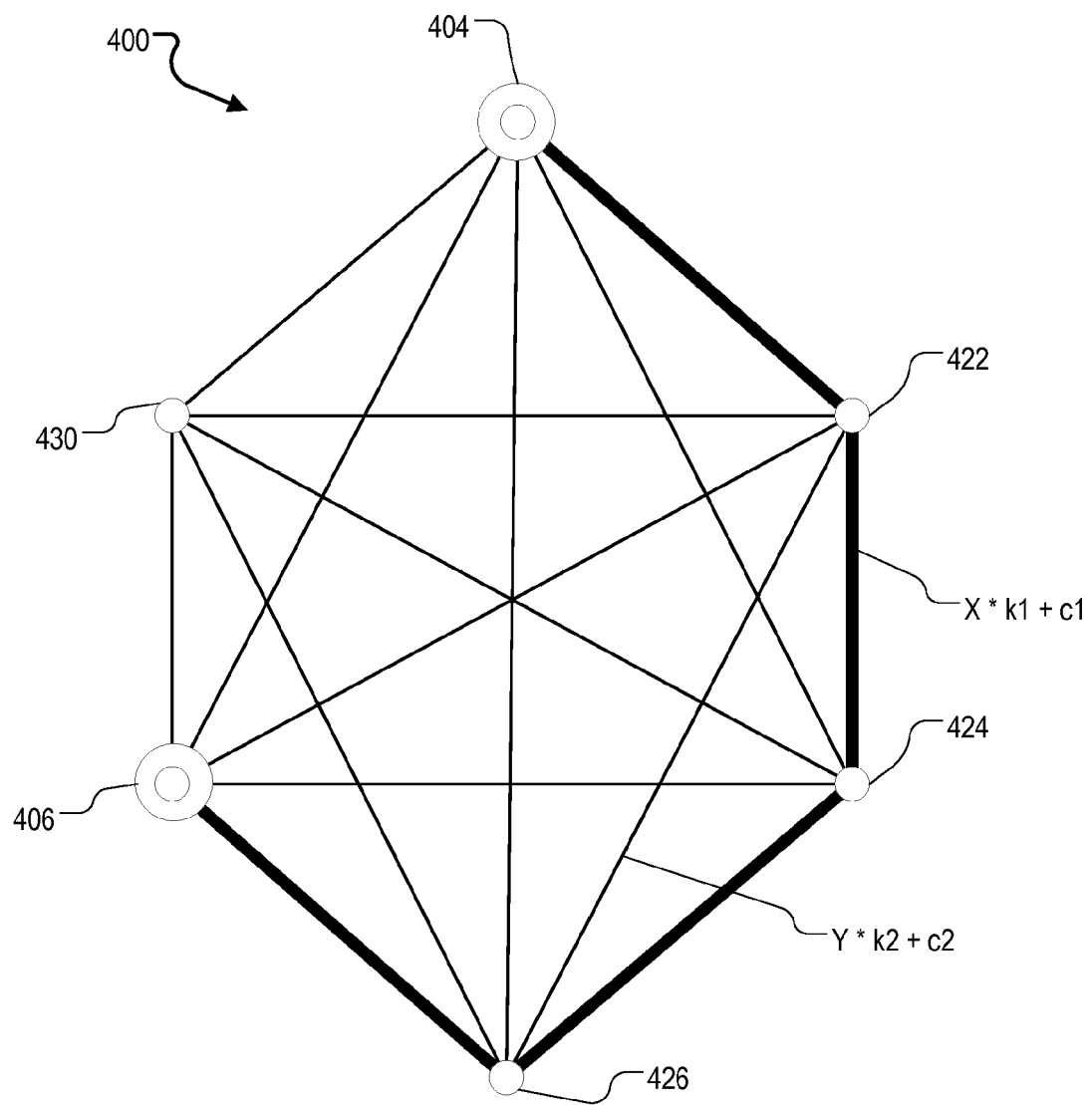
FIG. 4 illustrates an example navigation graph.

FIG. 4 illustrates an example navigation graph 400. Navigation graph 400 can define a data structure representing venue 104 (of FIG. 1). The navigation graph generator can generate navigation graph 400 from navigation areas including waypoint areas, connection areas, and destination areas. For convenience, only a portion of a complete navigation graph for venue 104 is shown in FIG. 4.

Navigation graph 400 can have nodes and edges connecting the nodes. Each edge can be associated with a respective weight. The navigation graph generator can represent each waypoint area, connection area or destination area as a respective node in navigation graph 400. For example, the navigation graph generator can represent destination areas 204 and 206 as nodes 404 and 406, respectively. The navigation graph generator can represent waypoint areas 126, 128 and 132 as nodes 422, 424 and 426, respectively. The navigation graph generator can represent the first connection area as described above in reference to FIG. 3 as node 430.

The navigation graph generator can place an edge between each pair of nodes that represent navigation areas that are reachable from one another. In some implementations, the result can be a complete graph. The navigation graph generator can associate a weight to each edge. The weight of an edge can be a distance between centroids of the navigation areas associated with the nodes connected by the edge.

In some implementations, the navigation graph generator can adjust each weight by various factors. For example, if waypoint areas 126 and 128 are on different floors, and the distance between waypoints 118 and 120 is X meters (or feet or yards), the navigation graph generator can increase the weight by assigning a weight of X*k1+c1 to the edge between nodes 422 and 424, where k1 is a factor greater than or equal to one, and c1 is a constant (or function) having a value that is equal to or greater than zero.

Likewise, the navigation graph generator can increase the weight on an edge between two nodes if a direct-line distance between centroids of navigation areas represented by the two nodes is interrupted by a waypoint area or a destination area. For example, a direct-line distance between waypoint areas 126 and 132 (Y meters) is interrupted by waypoint area 128. Accordingly, the navigation graph generator can increase the weight by assigning a weight of Y*k2+c2 to the edge between nodes 422 and 426, where k2 is a factor greater than or equal to one, and c2 is a constant (or function) having a value that is equal to or greater than zero. In particular, if the interrupting area is a destination area, the navigation graph generator can assign a particular large value for k2 or c2, e.g., to a pre-specified maximum value. In doing so, the navigation graph generator can discourage routing that skips waypoint areas or routing that, for example, leads through a store rather than through a walkway.

In some implementations, the navigation graph generator can increase a weight on an edge based on non-physical features in the venue data that may restrict a pedestrian's movement. For example, if a section of a path passes through a one-way security checkpoint or an entrance that requires a ticket, the navigation graph generator can increase a weight on an edge representing that section of the path.

In navigation time, a navigator can use navigation graph 400 to provide turn-by-turn instructions for moving inside venue 104 for mobile device 102. The navigator can include a processor of mobile device 102, a processor on a server located remotely from the mobile device, or both. The navigator can receive navigation graph 400, a start point (e.g., a current location) of mobile device 102, and an end point for navigation. Based on the received information, the navigator can determine that the start point intersects destination area 204 represented by node 404, and that the end point intersects destination area 206 represented by node 406.

The navigator can determine a shortest path from node 404 to node 406 based on weights of the edges in navigation graph 400. The navigator can determine the shortest path using various algorithm, e.g., Dijkstra's algorithm, Bellman-Ford algorithm, or other algorithms. In the example shown, the navigator can determine that the shortest path includes nodes 404, 422, 424, 426 and 406, in that order. The navigator can then provide turn-by-turn instructions based on a current location of mobile device 102 and an intersection of the current location and one or more areas represented by nodes 404, 422, 424, 426 and 406.

Example Turn-by-Turn Navigation

Figure 5:
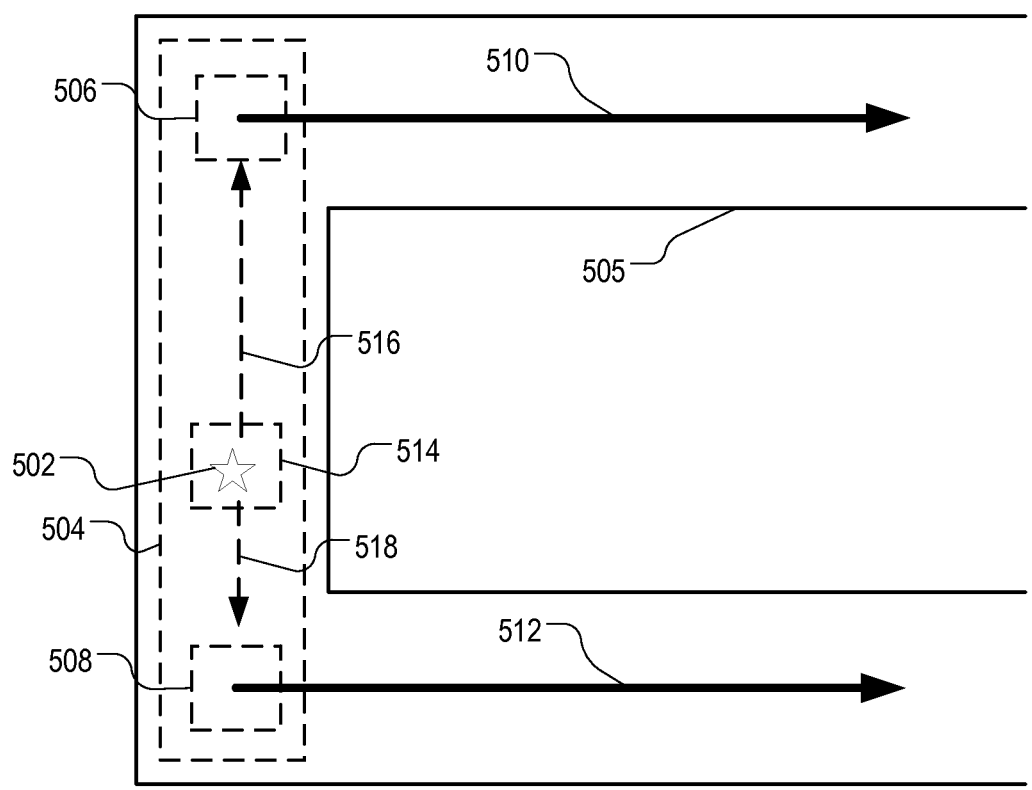
FIG. 5 is a diagram illustrating example techniques for polygonal routing where a start point is outside of waypoint areas.

FIG. 5 is a diagram illustrating example techniques for polygonal routing where a start point is outside of waypoint areas. In FIG. 5, a navigator receives a request to navigate a mobile device (e.g., mobile device 102 of FIG. 1) from start point 502 to an end point. The navigator can determine that start point 502 of the mobile device is not in a waypoint area or a destination area, but in connection area 504. Connection area 504 can be, for example, a section of walkway 505. The navigator can determine that secondary waypoint areas 506 and 508 are the secondary waypoint areas that intersect connection area 504. In addition, the navigator can determine that, among waypoint areas and destination areas, secondary waypoint areas 506 and 508 are closest to start point 502. The navigator can determine shortest path 510 from secondary waypoint area 506 to the end point. The navigator can determine shortest path 512 from secondary waypoint area 508 to the end point.

The navigator can determine that neither shortest path 510 nor shortest path 512 intersects area 514, which is an area surrounding start point 502. Accordingly, the navigator can determine a first candidate path to the end point through secondary waypoint area 506. The navigator can assign a first weight to the first candidate path. The first weight can equal to a length of shortest path 510 plus a length of distance 516 between starting area 514 and secondary waypoint area 506. The navigator can determine a second candidate path to the end point through secondary waypoint area 508. The navigator can assign a second weight to the second candidate path. The second weight can equal to a length of shortest path 512 plus a length of distance 518 between starting area 514 and secondary waypoint area 508. The navigator can select a shorter one of the first and second candidate paths based on the first and second weights. The navigator can designate the shorter candidate path as a path for navigating from start point 502 to the end point.

In some implementations, the navigator can assign a weight to the candidate paths based on a user's movement direction. The navigator can assign a higher weight to a candidate path that is in the movement direction. For example, the navigator can determine that the mobile device is moving from starting area 514 to secondary waypoint area 506 and away from secondary waypoint area 508. Accordingly, the navigator can assign a higher weight to the first candidate path through secondary waypoint area 506 than to the second candidate path through secondary waypoint area 508. The navigator can choose the navigating path based on the weight, and direct a user to change directions only upon determining that the second candidate path is significantly shorter than the first candidate path, e.g., when the difference in distances exceeds a threshold value.

Figure 6:
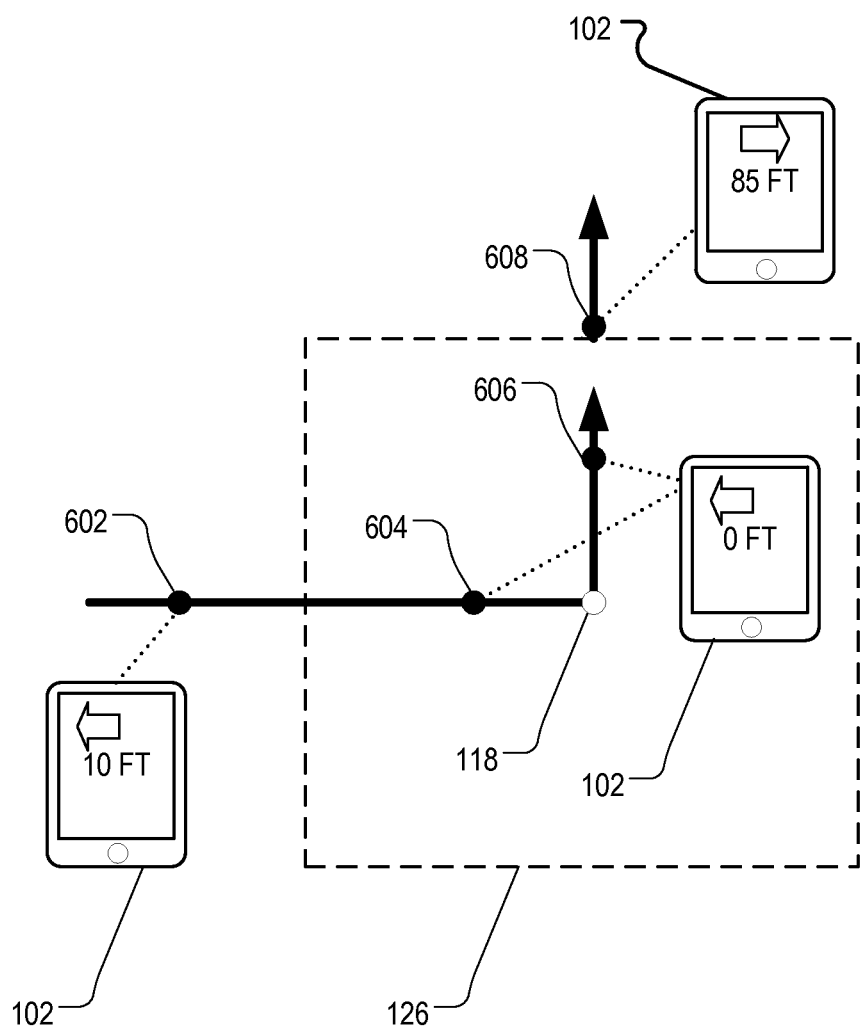
FIG. 6 illustrates example techniques for delayed instruction in polygonal routing.

FIG. 6 illustrates example techniques for delayed instruction in polygonal routing. Mobile device 102 can be moving in venue 104 (of FIG. 1). A navigator on board of mobile device 102 or located remotely from mobile device 102 can present audio or visual instructions on a direction of a next turn and distance of next turn.

At location 602, the navigator can determine that a distance between location 602 of mobile device 102 and a next waypoint area (e.g., waypoint area 126) is 10 feet. The navigator can calculate the distance between location 602 and waypoint area 126 using the distance between location 602 and waypoint 118, which is a secondary waypoint and a centroid of waypoint area 126. The navigator can then cause mobile device 102 to present an instruction indicating a next turn is a left turn, and a distance to the next turn is the distance between location 602 and waypoint area 126 (10 feet).

Upon determining that mobile device 102 has entered waypoint area 126, the navigator can keep presenting the instruction for direction of next turn (left, in this example). The navigator can update the distance to next turn as zero (0 feet). Accordingly, for example, when the navigator determines that the location of mobile device 102 is location 604 or location 606, the navigator can cause mobile device 102 to present an instruction indicating a next turn is a left turn, and a distance to the next turn is zero. Mobile device 102 can present the same instruction before or after mobile device 102 makes the actual left turn. Accordingly, even if mobile device 102 moves randomly inside waypoint area 126 (e.g., by taking a short cut instead of making a perpendicular turn), the instruction being presented can remain consistent, to avoid user confusion.

Upon determining that mobile device 102 has exited waypoint area 126, the navigator can trigger mobile device 102 to update the instruction. For example, the navigator can determine that mobile device 102 moved from inside waypoint area 126 to location 608, which is outside of waypoint area 126. In response, the navigator can update the instruction presented, including, for example, providing a direction for a next turn (e.g., turn right) after the turn made in waypoint area 126, and a distance (e.g., 85 feet) to the next turn.

Example System Components

Figure 7:
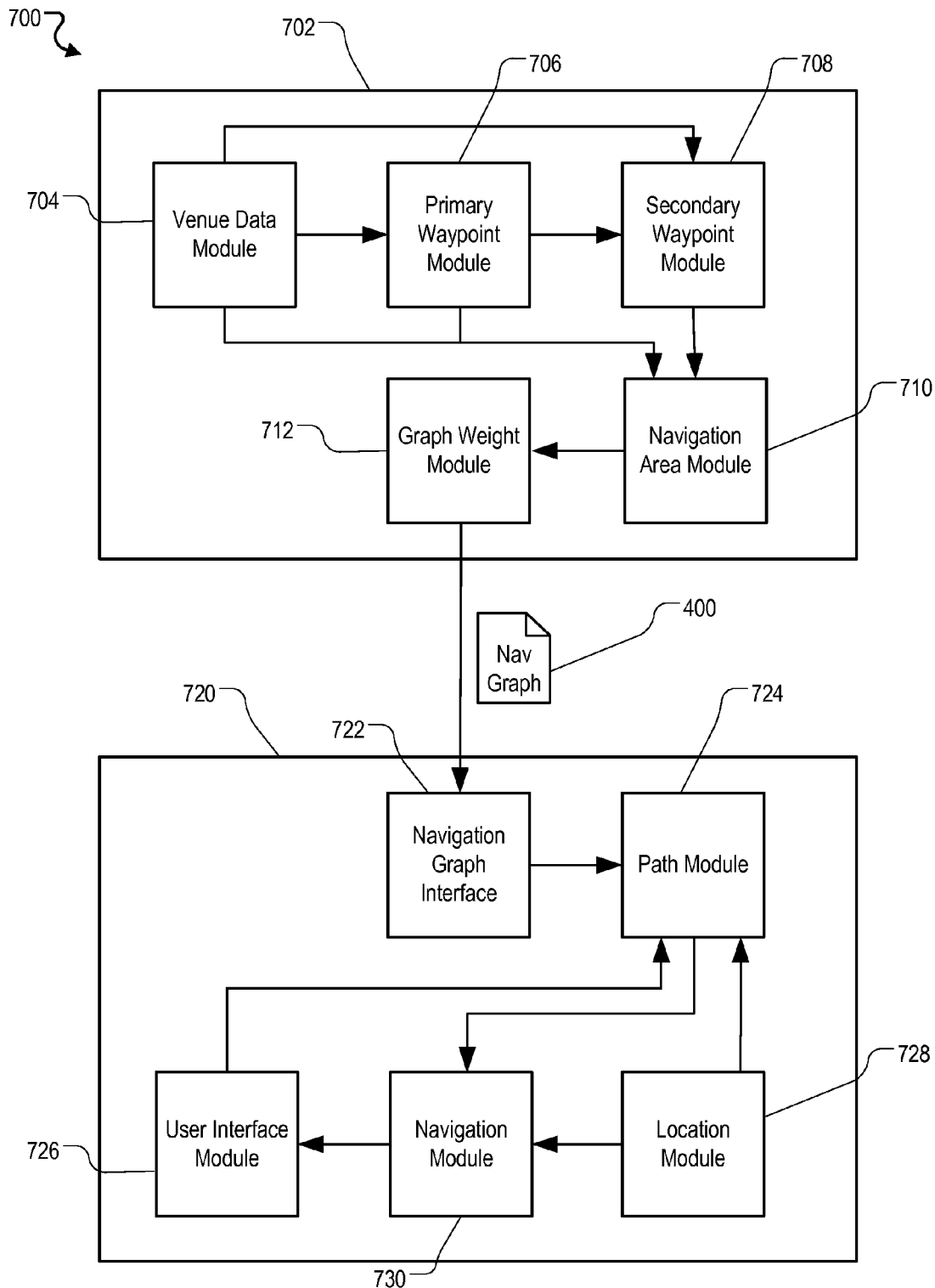
FIG. 7 is a block diagram illustrating components of an example computer system implementing polygonal routing.

FIG. 7 is a block diagram illustrating components of an example computer system 700 implementing polygonal routing. System 700 can include one or more processors. System 700 can include navigation graph generator 702 and navigator 720.

Navigation graph generator 702 is configured to generate a navigation graph, e.g., navigation graph 400 of FIG. 4, from venue data. Navigation graph generator 702 can include venue data module 704. Venue data module 704 can be a component of navigation graph generator 702 configured to obtain venue data defining features of a venue (e.g., venue 104) from various sources, e.g., computers for storing venue features, survey devices for determining unit entrances, or both. Venue data module 704 can provide the received venue data to primary waypoint module 706.

Primary waypoint module 706 can be a component of navigation graph generator 702 configured to generate a map of a venue from venue data provided by venue data module 704. Primary waypoint module 706 can then generate a map of the venue and display the map on a display surface (e.g., a touch sensitive screen). Primary waypoint module 706 can receive user input, or input from other sources, placing primary waypoints on the map. In some implementations, primary waypoint module 706 can generate the primary waypoints by placing primary waypoints at intersections, entrances and bends of walkways or other spaces connecting various units. Primary waypoint module 706 can determine a path (e.g., path 232) that connects the primary waypoints. Primary waypoint module 706 can provide the path to secondary waypoint module 708.

Secondary waypoint module 708 is a component of navigation graph generator 702 configured to receive a path in a venue from primary waypoint module 706, receive polygons or other shapes representing various units in the venue from venue data module 704, and generate secondary waypoints on the path. Secondary waypoint module 708 can determine shortest distances between units and the path, in some instances shortest distances through an entrance of a unit. Secondary waypoint module 708 can then determine the secondary waypoints by identifying the intersection of the shortest distances and the path. Secondary waypoint module 708 can provide the secondary waypoints to navigation area module 710.

Navigation area module 710 can be a component of navigation graph generator 702 configured to determine location, size, and shape of navigation areas including destination areas, connection areas and waypoint areas for navigating in a venue. Navigation area module 710 can determine the destination areas using venue data provided by venue data module 704. Navigation area module 710 can determine the connection areas and primary waypoint areas using output from venue data module 704 and output from primary waypoint module 706. Navigation area module 710 can determine the secondary waypoint areas using venue data from venue data module 704, output from primary waypoint module 706, and output from secondary waypoint module 708. Navigation area module 710 can provide the navigation areas to graph weight module 712.

Graph weight module 712 is a component of navigation graph generator 702 configured to determine a navigation graph, e.g., navigation graph 400 from the location, size, and shape of navigation areas provided by navigation area module 710. Graph weight module 712 can represent the navigation areas as nodes in the navigation graph, connect the nodes that are reachable from one another using edges, and assign a weight to each edge. Graph weight module 712 can adjust weight based on various factors, e.g., different floors, interrupting units or access restrictions as described above in reference to FIG. 4. Graph weight module 712 can provide the generated and weighted navigation graph 400 to navigator 720.

Navigator 720 can include navigation graph interface 722 configured to receive navigation graph 400 from navigation graph generator 702. Navigation graph interface 722 can provide the received navigation graph 400 to path module 422.

Path module 724 can be a component of navigator 720 configured to receive navigation graph 400, receive a user input from user interface module 726 specifying an end point of navigation and optionally a start point for navigation, and receive a current location from location module 728. If the user interface module 726 does not specify a start point, path module 724 can designate the current location received from location module 728 as a start point. Location module 728 can include systems of determining a location of a mobile device being navigated. The systems can include one or more of, for example, a global navigation satellite system (GNSS) receiver, a wireless location system, a dead reckoning location system or any combination of the above.

Path module 724 can determine a shortest path from the start point to the end point. Path module 724 can represent the shortest path as a series of navigation areas (e.g., polygons). Path module 724 can provide the shortest path to navigation module 730 for navigation.

Navigation module 730 can be a component of navigator 720 configured to determine turn-by-turn navigation instructions based on the shortest path received from path module 724 and a location of the mobile device provided by location module 728 as the mobile device moves in the venue. Navigation module 730 can update the instructions upon determining that the mobile device enters into or exits from a navigation area. Navigation module 730 can provide the instructions and updates to user interface module 726. User interface module 726 can present the instructions and updates as audio, visual or tactile outputs to a user.

Navigation graph generator 702 and navigator 720 can be implemented on a same computing device (e.g., a server or a mobile device), or on separate computing devices (e.g., navigation graph generator 702 on a server, navigator 720 on mobile device 102). In some implementations, user interface module 726, location module 728, and optionally, navigation module 730 are implemented on mobile device 102, whereas the other modules are implemented on a server. Each component of navigation graph generator 702 and navigator 720 can include hardware components, software components, or both.

Example Procedures

Figure 8:
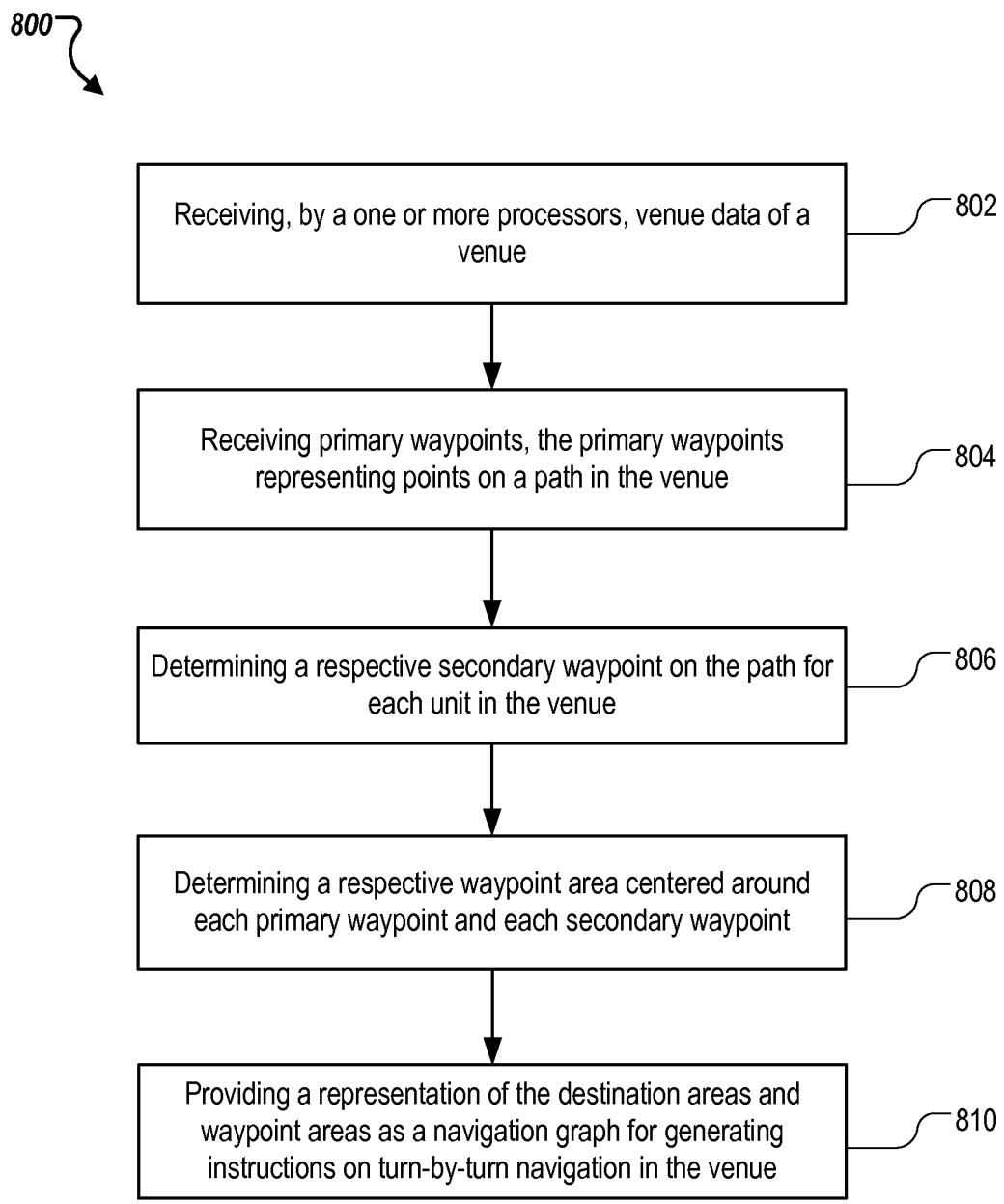
FIG. 8 is a flowchart of an example process of generating a navigation graph for polygonal routing.

FIG. 8 is a flowchart of example process 800 of generating a navigation graph for polygonal routing. Process 800 can be performed by a system including one or more processors, e.g., by navigation graph generator 702 of FIG. 7.

The system can receive (802) venue data. The venue data can including representations of destination areas each representing a unit in the venue. Each destination area can be a polygon enclosing the unit.

The system can receive (804), from an input device, multiple primary waypoints. The primary waypoints can represent points on a path in the venue. Each primary waypoint can be located at a respective intersection on the path. The system can determine the path based on the primary waypoints and shape of a space enclosing the primary waypoints. The path can include multiple segments. Each segment can be a length of the path defined at least in part by two adjacent primary waypoints. Each unit can be located adjacent to the path.

The system can determine (806) a respective secondary waypoint on the path for each unit located adjacent to the path. The system can determine each secondary waypoint based on a closest distance between a centroid of the unit and the path. A distance between the secondary waypoint and a centroid of the unit can be a shortest distance between the path and the centroid of the unit. The system can determine each secondary waypoint by finding a respective intersection of the shortest distance and the path and designating each intersection as a secondary waypoint. The shortest distance between the path and the centroid of the unit can be a distance between the path and the centroid through an entrance of the unit.

The system can determine (808) a respective waypoint area centered on each primary and secondary waypoint. Each waypoint area can have a perimeter that is limited by a width of the path. For example, each waypoint area can have a perimeter that reaches to the closest edge (e.g., a wall or a handrail) of the path. Each segment of the path can be represented as a connection area in the navigation graph. Each destination area, waypoint area, and connection area can have any shape that occupies a non-zero area, e.g., a polygon, a circle or an ellipse.

The system can provide (810) a representation of navigation areas as a navigation graph for generating instructions on turn-by-turn navigation in the venue. The navigation areas can include the destination areas, waypoint areas, connection areas or any combination of the above. Providing the navigation areas as a navigation graph can include, from the navigation areas, determining nodes, edges and weights of the navigation graph. Each of the nodes can represent a destination area, a waypoint area, or connection area. Each of the edges can connect two nodes in the navigation graph that are reachable to one another. Each of the weights can be associated with a respective edge in the navigation graph. Each weight can represent a distance between centroids of the areas represented by the two nodes connected by the edge. In addition, each weight can be adjusted based on various factors including different floor level, interrupting units, access restrictions, or any combination of the above.

Figure 9:
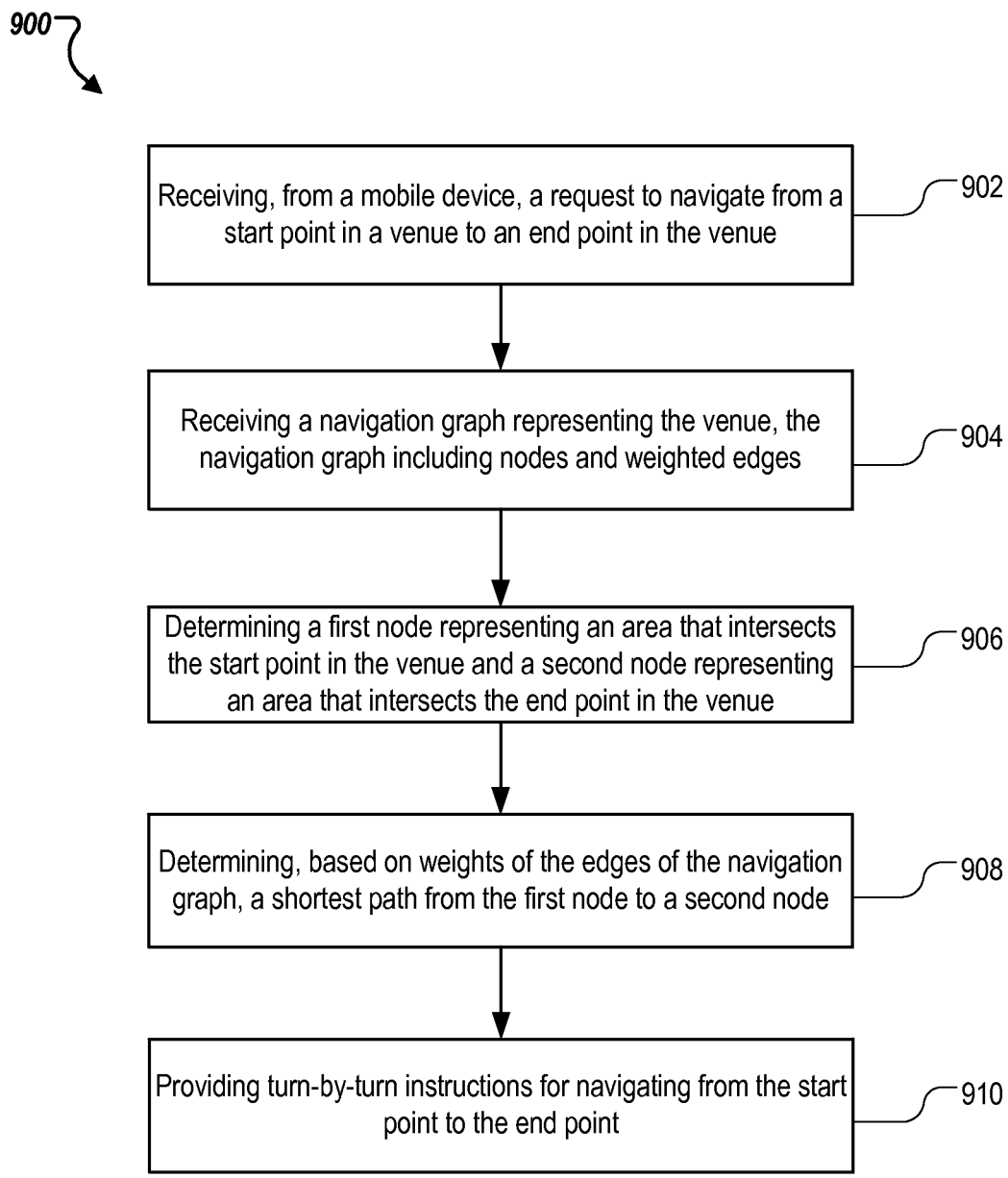
FIG. 9 is a flowchart of an example process of polygonal routing using a navigation graph.

FIG. 9 is a flowchart of example process 900 of polygonal routing using a navigation graph. Process 900 can be performed by a system including one or more processors, e.g., by navigator 720 of FIG. 7. The one or more processors can be components of a mobile device (e.g., mobile device 102) or components of a server that is located remotely from the mobile device.

The system can receive (902), from a mobile device, a request to navigate from a start point in a venue to an end point in the venue. The request can be originally made by a user and received through a user interface module and optionally, through a communications network. The venue can include multiple units.

The system can receive (904) from a navigation graph generator, a navigation graph representing the venue. The navigation graph can include nodes representing navigation areas. The navigation areas can include destination areas, waypoint areas, connection areas, or any combination of the above. The navigation graph can include edges each connecting two of the nodes. Each edge can be associated with a weight representing a distance between navigation areas represented by the two nodes connected by the edge. The weights may have been adjusted by level difference, interrupting units, access restrictions or any combination of the above. For example, the distance between the two nodes can include (1) a direct-line distance between centroids of two areas represented by the two nodes if no unit in the venue interrupts the direct-line distance, (2) a direct-line distance between centroids of two areas represented by the two nodes adjusted by a factor (e.g., k2, c2 or both as described above) associated with a navigation area (e.g., a destination area representing a unit or a waypoint area) in the venue that interrupts the direct-line distance, or (3) a distance that represents a vertical separation. In case (3), the connection can be an item that facilitates vertical movement, e.g., an escalator or elevator. The two areas may be separated not by a horizontal distance, but by a vertical distance, e.g., by different levels of a building.

The waypoint areas can include primary and secondary waypoint areas as described above. Each waypoint area can have a centroid (a primary waypoint or a secondary waypoint) located on a path in the venue. A distance between the centroid and a centroid of a destination area can be a shortest distance between the centroid of the destination area and the path. The shortest distance may be through an entrance.

The navigation graph can include one or more nodes each representing a connection area. The connection area can be a segment of a path in the venue. The path can include, for example, at least a section of a walkway connecting multiple waypoint areas.

The system can determine (906) a first node representing a navigation area that intersects the start point in the venue and a second node representing a navigation area that intersects the end point in the venue.

The system can determine (908) based on weights of the edges of the navigation graph, a shortest path from the first node to a second node. The shortest path can including one or more intermediate nodes each representing a respective waypoint area or destination area. In some cases, determining the first node representing an area that intersects the start point can include determining that the start point intersects only a connection area represented in the navigation graph but not a destination area or a waypoint area represented in the navigation graph. In these cases, determining the shortest path can include the following operations. The system can determine multiple candidate shortest paths each from a candidate area that intersects the connection area and neighbors the start point to the navigation area that intersects the end point. The system can then select the shortest path from the candidate shortest paths based on lengths of the candidate shortest paths and a respective distance between the start point and each candidate area.

The system can provide (910) turn-by-turn instructions for navigating from the start point to the end point. Providing the instructions can include updating a next-turn instruction upon determining that the mobile device has entered or exited a navigation area (e.g., a waypoint area or a destination area) in the venue that is represented by a node on the shortest path. Updating a next-turn instruction can be triggered by exit of the mobile device from a waypoint area in which the mobile device has been previously instructed to turn.

Example Mobile Device Architecture

Figure 10:
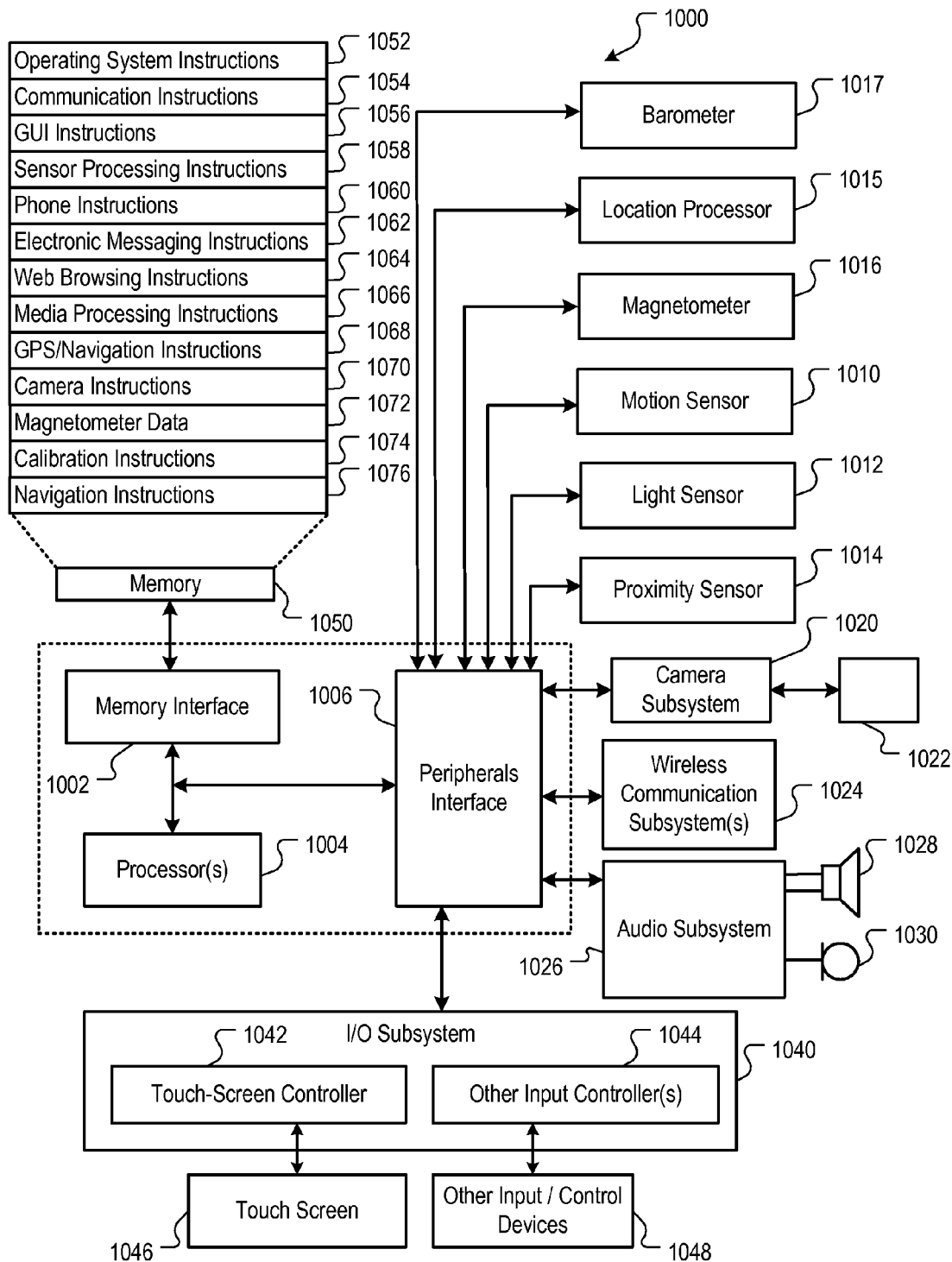
FIG. 10 is a block diagram illustrating an example device architecture of a mobile device implementing the features and operations described in reference to FIGS. 1-9.

FIG. 10 is a block diagram of an example architecture 1000 for a mobile device. A mobile device (e.g., mobile device 102) can include memory interface 1002, one or more data processors, image processors and/or processors 1004, and peripherals interface 1006. Memory interface 1002, one or more processors 1004 and/or peripherals interface 1006 can be separate components or can be integrated in one or more integrated circuits. Processors 1004 can include application processors, baseband processors, and wireless processors. The various components in the mobile device, for example, can be coupled by one or more communication buses or signal lines.

Sensors, devices and subsystems can be coupled to peripherals interface 1006 to facilitate multiple functionalities. For example, motion sensor 1010, light sensor 1012 and proximity sensor 1014 can be coupled to peripherals interface 1006 to facilitate orientation, lighting and proximity functions of the mobile device. Location processor 1015 (e.g., GPS receiver) can be connected to peripherals interface 1006 to provide geopositioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass. Motion sensor 1010 can include one or more accelerometers configured to determine change of speed and direction of movement of the mobile device. Barometer 1017 can include one or more devices connected to peripherals interface 1006 and configured to measure pressure of atmosphere around the mobile device.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network (s) over which a mobile device is intended to operate. For example, a mobile device can include communication subsystems 1024 designed to operate over a GSM network, a GPRS network, an EDGE network, a Wi-Fi™ or WiMax™ network and a Bluetooth™ network. In particular, the wireless communication subsystems 1024 can include hosting protocols such that the mobile device can be configured as a base station for other wireless devices.

Audio subsystem 1026 can be coupled to a speaker 1028 and a microphone 1030 to facilitate voice-enabled functions, such as voice recognition, voice replication, digital recording, and telephony functions. Audio subsystem 1026 can be configured to receive voice commands from the user.

I/O subsystem 1040 can include touch surface controller 1042 and/or other input controller(s) 1044. Touch surface controller 1042 can be coupled to a touch surface 1046 or pad. Touch surface 1046 and touch surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 1046. Touch surface 1046 can include, for example, a touch screen.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In one implementation, a pressing of the button for a first duration may disengage a lock of the touch surface 1046; and a pressing of the button for a second duration that is longer than the first duration may turn power to mobile device 102 on or off. The user may be able to customize a functionality of one or more of the buttons. The touch surface 1046 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store operating system 1052, such as Darwin, RTXC, LINUX, UNIX, OS X, WINDOWS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers and/or one or more servers. Memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; camera instructions 1070 to facilitate camera-related processes and functions; magnetometer data 1072 and calibration instructions 1074 to facilitate magnetometer calibration. The memory 1050 may also store other software instructions (not shown), such as security instructions, web video instructions to facilitate web video-related processes and functions, and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1050. Memory 1050 can store floor determination instructions 1076 that, when executed, can cause processor 1004 to perform navigation graph generation operations of example process 800 as described above in reference to FIG. 8, navigation operations of example process 900 as described above in reference to FIG. 9, or both.

Each of the above identified instructions and applications can correspond to a set of instructions for performing one or more functions described above. These instructions need not be implemented as separate software programs, procedures or modules. Memory 1050 can include additional instructions or fewer instructions. Furthermore, various functions of the mobile device may be implemented in hardware and/or in software, including in one or more signal processing and/or application specific integrated circuits.

Example Operating Environment

Figure 11:
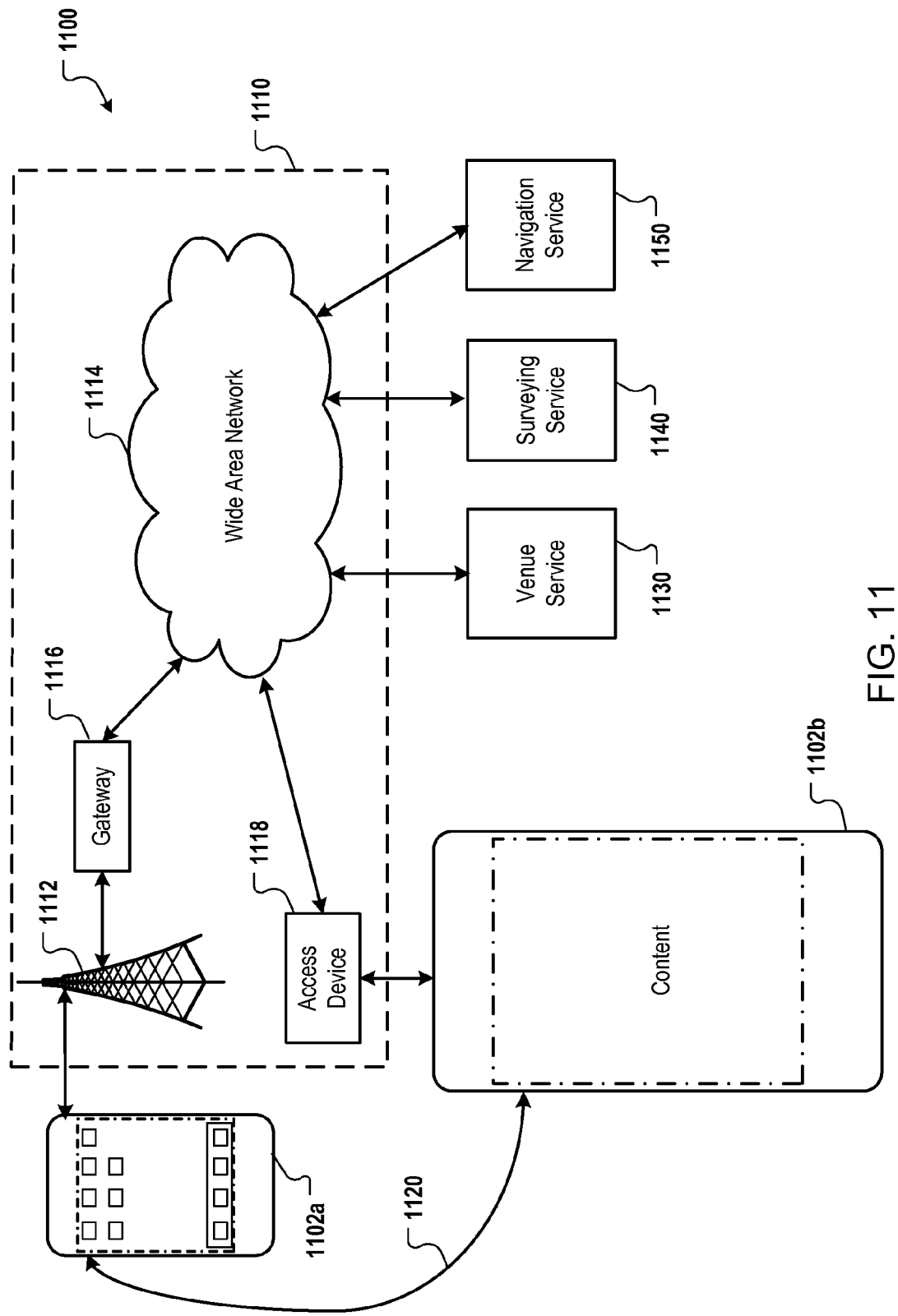
FIG. 11 is a block diagram of an example network operating environment for the mobile devices of FIGS. 1-9.

FIG. 11 is a block diagram of an example network operating environment 1100 for the mobile devices of FIGS. 1-9. Mobile devices 1102*a* and 1102*b* can, for example, communicate over one or more wired and/or wireless networks 1110 in data communication. For example, a wireless network 1112, e.g., a cellular network, can communicate with a wide area network (WAN) 1114, such as the Internet, by use of a gateway 1116. Likewise, an access device 1118, such as an 802.11g wireless access point, can provide communication access to the wide area network 1114. Each of mobile devices 1102*a* and 1102*b* can be mobile device 102.

In some implementations, both voice and data communications can be established over wireless network 1112 and the access device 1118. For example, mobile device 1102*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1112, gateway 1116, and wide area network 1114 (e.g., using Transmission Control Protocol/Internet Protocol (TCP/IP) or User Datagram Protocol (UDP)). Likewise, in some implementations, the mobile device 1102*b* can place and receive phone calls, send and receive e-mail messages, and retrieve electronic documents over the access device 1118 and the wide area network 1114. In some implementations, mobile device 1102*a* or 1102*b* can be physically connected to the access device 1118 using one or more cables and the access device 1118 can be a personal computer. In this configuration, mobile device 1102*a* or 1102*b* can be referred to as a "tethered" device.

Mobile devices 1102*a* and 1102*b* can also establish communications by other means. For example, wireless device 1102*a* can communicate with other wireless devices, e.g., other mobile devices, cell phones, etc., over the wireless network 1112. Likewise, mobile devices 1102*a* and 1102*b* can establish peer-to-peer communications 1120, e.g., a personal area network, by use of one or more communication subsystems, such as the Bluetooth™ communication devices. Other communication protocols and topologies can also be implemented.

The mobile device 1102*a* or 1102*b* can, for example, communicate with one or more services 1130, 1140, and 1150 over the one or more wired and/or wireless networks. For example, one or more venue services 1130 can provide venue data to mobile devices 1102*a* and 1102*b* from a venue data source. The venue data can include venue identifiers associated with venue maps. Survey service 1140 can receive survey data from one or more survey devices. A navigation graph generator, or a location service provider, can determine entrances of various units in a venue using the survey data, which can indicate where a surveyor enters a unit. Navigation service 1150 can include providing navigation graph for venues to mobile devices 1102*a* and 1102*b*, or, in some implementations, provide turn-by-turn instructions to mobile devices 1102*a* and 1102*b*.

Mobile device 1102*a* or 1102*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 1102*a* or 1102*b*. Such access can be provided by invocation of a web browsing function or application (e.g., a browser) in response to a user touching, for example, a Web object.

Example System Architecture

Figure 12:
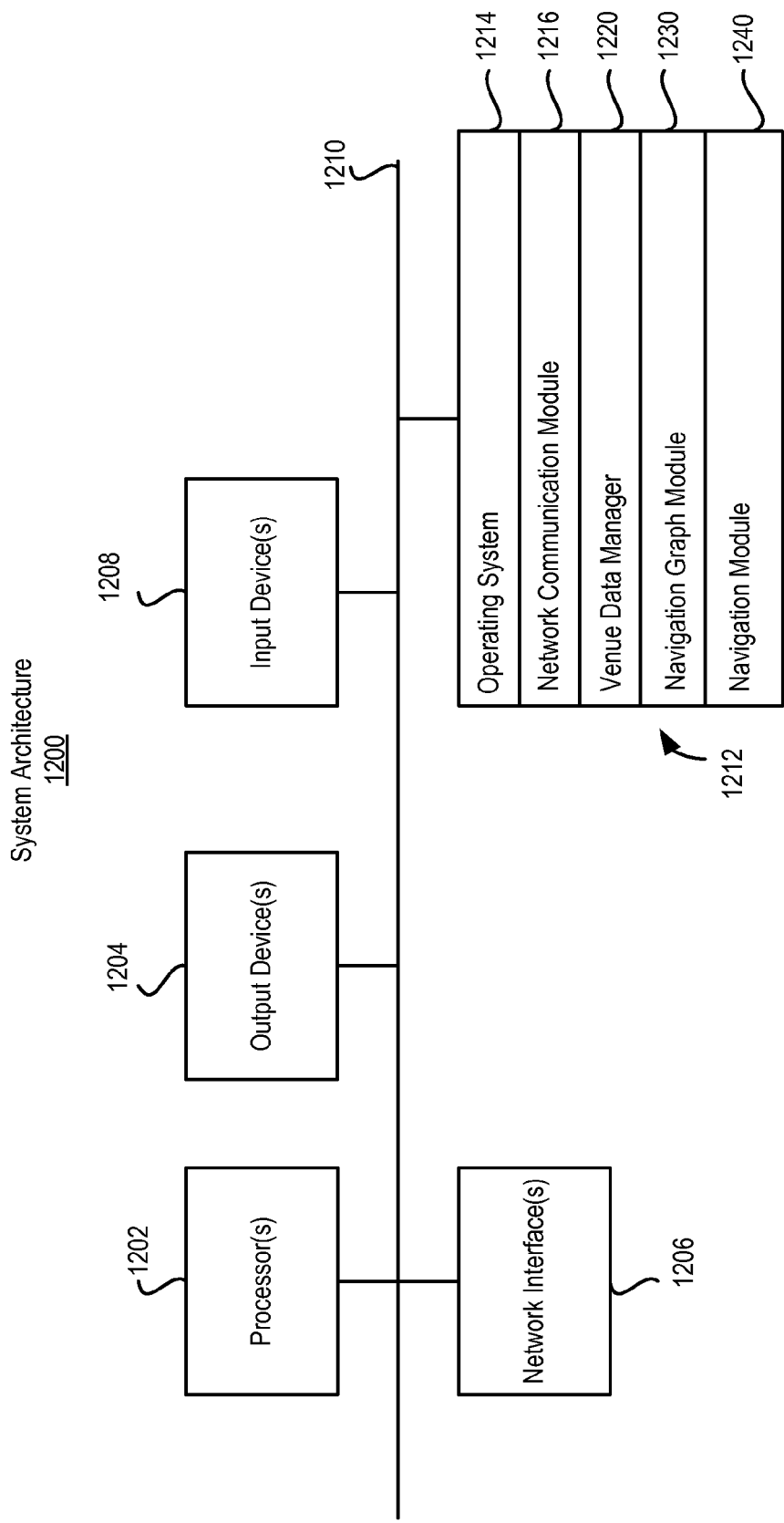
FIG. 12 is a block diagram of a system architecture for an example computer system implementing polygonal routing.

FIG. 12 is a block diagram of a system architecture for example location server 602. Other architectures are possible, including architectures with more or fewer components. In some implementations, architecture 1200 includes one or more processors 1202 (e.g., dual-core Intel® Xeon® Processors), one or more output devices 1204 (e.g., LCD), one or more network interfaces 1206, one or more input devices 1208 (e.g., mouse, keyboard, touch-sensitive display) and one or more computer-readable mediums 1212 (e.g., RAM, ROM, SDRAM, hard disk, optical disk, flash memory, etc.). These components can exchange communications and data over one or more communication channels 1210 (e.g., buses), which can utilize various hardware and software for facilitating the transfer of data and control signals between components.

The term "computer-readable medium" refers to a medium that participates in providing instructions to processor 1202 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1212 can further include operating system 1214 (e.g., a Linux® operating system), network communication module 1216, venue data manager 1220, navigation graph module 1230 and navigation module 1240. Operating system 1214 can be multi-user, multiprocessing, multitasking, multithreading, real time, etc. Operating system 1214 performs basic tasks, including but not limited to: recognizing input from and providing output to network interfaces 1206, devices 1204 and devices 1208; keeping track and managing files and directories on computer-readable mediums 1212 (e.g., memory or a storage device); controlling peripheral devices; and managing traffic on the one or more communication channels 1210. Network communications module 1216 includes various components for establishing and maintaining network connections (e.g., software for implementing communication protocols, such as TCP/IP, HTTP, etc.).

Venue data manager 1220 can include computer instructions that, when executed, cause processor 1202 to perform functions of obtaining venue data from a venue data source or generate venue data. To generate venue data, the computer instructions can cause processor 1202 to perform the operations of receiving a venue map of a venue from a venue data source, receiving survey data from s survey data source, determining entrances to various units in the venue using the survey data, and designating the surveyed venue map including information on entrances as the venue data. Navigation graph module 1230 can include computer instructions that, when executed, cause processor 1202 to perform operations of navigation graph generator 702. Navigation module 1240 can include computer instructions that, when executed, cause processor 1202 to perform at least a portion of the operations of navigator 720.

Architecture 1200 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
    receiving, from a mobile device at one or more processors, a request to navigate from a start point in a venue to an end point in the venue;
    receiving, at the one or more processors, a navigation graph representing the venue, the navigation graph including:
        nodes representing destination areas and waypoint areas, wherein each destination area and waypoint area is defined by a respective geometric shape, and
        one or more edges, wherein each edge connects two of the nodes, and wherein each edge is associated with a respective weight representing a distance between the areas represented by the two nodes connected by the edge;
    determining, using the one or more processors, a first node representing a first area defined by a first geometric shape, wherein the first area intersects the start point in the venue, and a second node representing a second area defined by a second geometric shape, wherein the second area intersects the end point in the venue;
    determining, using the one or more processors based on weights of the edges of the navigation graph, a shortest path from the first node to a second node, the shortest path including one or more intermediate nodes each representing a respective waypoint area; and
    generating, using the one or more processors, turn-by-turn instructions for navigating from the start point to the end point, including updating a next-turn instruction upon determining that the mobile device has entered or exited a geometric shape of a waypoint area or destination area in the venue that is represented by a node on the shortest path.

2. The method of claim 1, wherein the one or more processors are components of the mobile device or components of a server that is located remotely from the mobile device.

3. The method of claim 1, wherein the distance between the two nodes includes:
    a direct-line distance between centroids of two areas represented by the two nodes if no unit in the venue interrupts the direct-line distance; or
    a direct-line distance between centroids of two areas represented by the two nodes adjusted by a factor associated with a unit in the venue that interrupts the direct-line distance.

4. The method of claim 1, wherein each waypoint area has a centroid located on a path in the venue, a distance between the centroid and a centroid of a destination area being a shortest distance between the centroid of the destination area and the path.

5. The method of claim 1, wherein the navigation graph further includes a node representing a connection area, the connection area being a segment of a path in the venue, the path including at least a section of a walkway or an open area connecting a plurality of waypoint areas.

6. The method of claim 5, wherein:
    determining the first node comprises determining that the start point intersects a connection area represented in the navigation graph but not a destination area or a waypoint area represented in the navigation graph; and
    determining the shortest path comprises:
        determining a plurality of candidate shortest paths each from a candidate area that intersects the connection area and neighbors the start point to the area that intersects the end point; and
        selecting the shortest path from the candidate shortest paths based on lengths of the candidate shortest paths and a distance between the start point to each candidate area.

7. The method of claim 1, wherein updating a next-turn instruction is triggered by exit of the mobile device from a waypoint area in which the mobile device has been previously instructed to turn.

8. A system, comprising:
    one or more processors; and
    a non-transitory computer-readable medium storing instructions that, when executed by the one or more processors, cause the one or more processors to perform operations comprising:
        receiving, from a mobile device at the one or more processors, a request to navigate from a start point in a venue to an end point in the venue;
        receiving, at the one or more processors, a navigation graph representing the venue, the navigation graph including:
            nodes representing destination areas and waypoint areas, wherein each destination area and waypoint area is defined by a respective geometric shape, and
            one or more edges, wherein each edge connects two of the nodes, and wherein each edge is associated with a respective weight representing a distance between the areas represented by the two nodes connected by the edge;
        determining, using the one or more processors, a first node representing a first area defined by a first geometric shape, wherein the first area intersects the start point in the venue, and a second node representing a second area defined by a second geometric shape, wherein the second area intersects the end point in the venue;

determining, using the one or more processors based on weights of the edges of the navigation graph, a shortest path from the first node to a second node, the shortest path including one or more intermediate nodes each representing a respective waypoint area; and generating, using the one or more processors, turn-by-turn instructions for navigating from the start point to the end point, including updating a next-turn instruction upon determining that the mobile device has entered or exited a geometric shape of a waypoint area or destination area in the venue that is represented by a node on the shortest path.

9. The system of claim 8, wherein the one or more processors are components of the mobile device or components of a server that is located remotely from the mobile device.

10. The system of claim 8, wherein the distance between the two nodes includes:
a direct-line distance between centroids of two areas represented by the two nodes if no unit in the venue interrupts the direct-line distance; or
a direct-line distance between centroids of two areas represented by the two nodes adjusted by a factor associated with a unit in the venue that interrupts the direct-line distance.

11. The system of claim 8, wherein each waypoint area has a centroid located on a path in the venue, a distance between the centroid and a centroid of a destination area being a shortest distance between the centroid of the destination area and the path.

12. The system of claim 8, wherein the navigation graph further includes a node representing a connection area, the connection area being a segment of a path in the venue, the path including at least a section of a walkway or an open area connecting a plurality of waypoint areas.

* * * * *